March 9, 1948.　　　C. F. STRATE　　　2,437,621

DEVICE FOR COMPUTING LAPSE OF TIME

Filed Nov. 2, 1946　　　2 Sheets-Sheet 1

Inventor
Carl F. Strate
Clarence E. Threedy
By

His Attorney

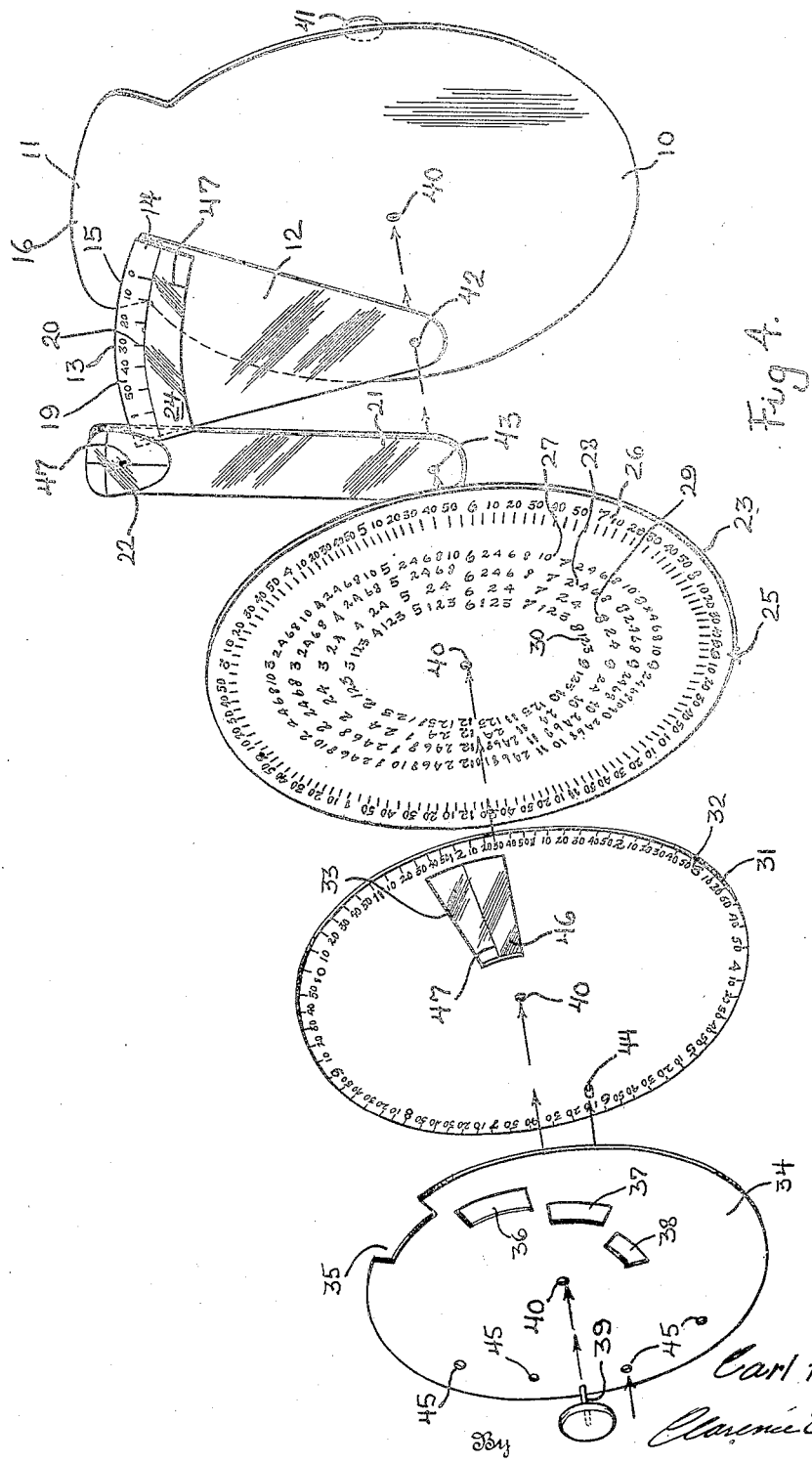

Patented Mar. 9, 1948

2,437,621

UNITED STATES PATENT OFFICE 2,437,621

DEVICE FOR COMPUTING LAPSE OF TIME

Carl F. Strate, Chicago, Ill.

Application November 2, 1946, Serial No. 707,470

6 Claims. (Cl. 235—78)

This invention relates to certain new and useful improvements in a device for computing lapse of time.

It is a device especially designed and intended to be used by timekeepers, bookkeepers, and others interested in problems involving lapse of time.

One of the principal objects of the invention is the provision of a device by means of which the interval occurring between any two times or periods of a day may be determined by simple adjustment with respect to each other of concentrically arranged dials or discs having printed or otherwise appearing thereon equal parts or divisions representing twelve hours of the day.

Another object of this invention is the provision of a device by means of which will deduct from the answer to any problem involving time elapsed any given interval of time which remains constant (up to one hour in length), which should not be counted in the final computation. Such a constant interval is, in most cases, a lunch period, which must be subtracted from the period compensated.

A still further and equally important object of the invention is the provision of a computer of this character by which the answer to any problem may be read in either hours and minutes or in any one of four different methods of dividing the hour, which system represents the four commonly used methods of dividing time for wage payment purposes.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 4 is a perspective view of the invention showing the several parts thereof in exploded relation with respect to each other.

Figure 1:
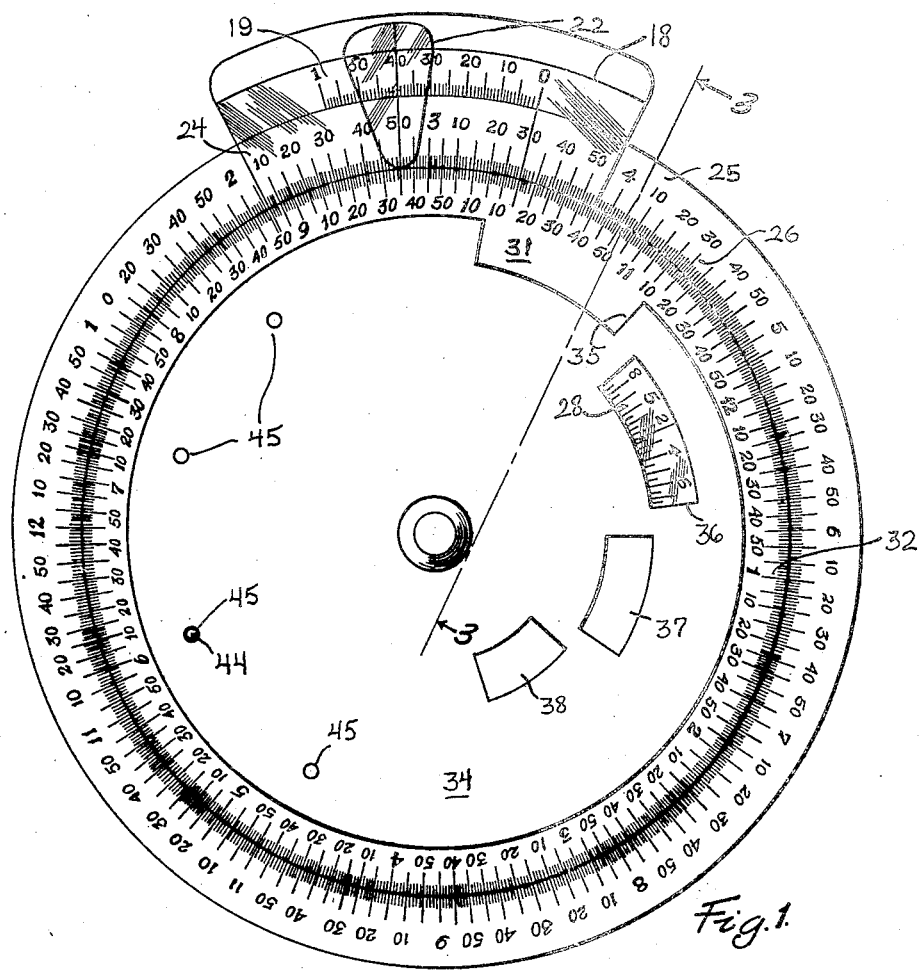
Fig. 1 is a plan view of the invention.
Figure 2:
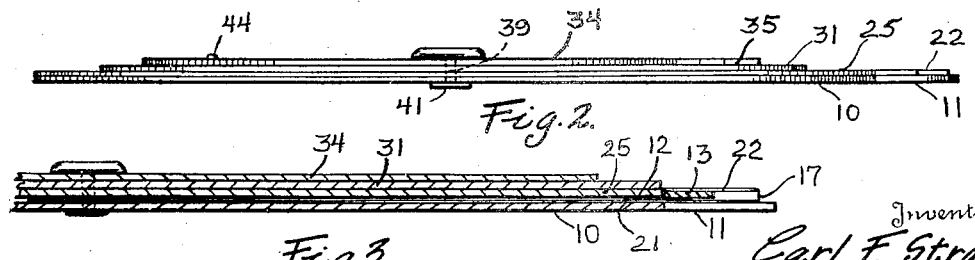
Fig. 2 is an edge view of the same.
Figure 3:
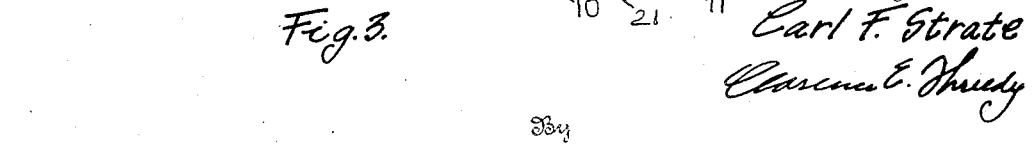
Fig. 3 is a fragmentary sectional detail view taken substantially on line 3—3 of Fig. 1.

The several objects of my invention are accomplished by the preferred form of construction shown in the accompanying drawings. In this connection, my computing device comprises a base or mounting plate 10 substantially circular in plan view and provided with a lateral tab 11.

Superimposed upon this base plate 10 is a triangular shaped segment 12 formed of transparent material and provided with a shoulder 13 having its corner portions 14 secured to the tab 11 with the edge portion 15 disposed inwardly of the edge portion 16 of the tab 11, by means of mounting blocks 17 which space the edge portion 15 from the tab to provide a longitudinal slot 18. This triangular segment 12 has printed or otherwise appearing on the marginal edge thereof a scale 19 subdivided into spaces representing minutes by the lines 20.

Arranged between the segment 12 and the plate 10 is a finger 21 having a superimposed transparent tab 22 secured thereto for movement over the scale bearing portion 19 of the segment 12.

Positioned upon the plate 10 with its marginal edge portion 23 rotatable beneath the transparent section 24 of the segment 12 is a disc 25 likewise circular in plan view and having a scale 26 printed on its marginal edge and divided into spaces, each representing one minute, there being 720 of such spaces representing 12 hours of the day.

Printed upon the middle surface of the disc 25 in concentric relation with respect to each other are scales 27, 28, 29 and 30, divided into intervals of 5, 6, 10 and 15 minutes respectively.

A third disc 31 is provided and this disc 31, like the disc 25, has appearing on its marginal edge a scale 32 divided similarly into 720 equal parts representing the 12 hours of the day. This disc 31 has an opening 33 formed therein through which portions of the scales 27 to 30 are exposed.

The scales on the discs 25 and 31 have the numbers indicating the hours emphasized by printing in heavy type whereas the numerals representing minutes are less emphasized, they being printed in lighter type.

Superimposed on the disc 31 is a cover disc 34. This cover disc 34 has viewing openings 35, 36, 37 and 38 formed therein in different radial positions with respect to each other, whereby the portions of the scales 27 to 30 inclusive will be selectively exposed through these openings.

The discs 25, 31 and 34 are rotatably connected to the base plate 10 by means of a pintle 39 projected through aligned openings 40 formed in the discs and the plate 10 and secured thereto by wedging the end of the pintle over upon a retaining button 41. This pintle 39 also passes through an opening 42 formed in the segment 12 as well as an opening 43 formed in the finger 21, the latter to pivotally connect the finger 21 to the base plate 10 for independent movement relative to the discs 25 and 31.

Fixedly carried by the disc 31 in any approved manner is a pin 44 adapted to selectively engage in the openings 45 formed in the cover disc 34, whereby to releasably latch this cover disc 34 in a selective position upon the disc 31 for reasons fully hereinafter set forth.

The opening 33 is closed by a transparent sheet 46 and this sheet 46 has formed thereon, as do each the transparent section 24 and the transparent tab 22, a hair-line 47 for registration with the lines of the various scales to which it is operatively related.

The use and operation of my improved computing device is best illustrated from the following examples.

Assuming that it is desired to determine in hours and minutes the length of a period of time beginning at a certain time of day and ending at another time (both of which might be indicated upon an employee's work card by means of figures printed by a recording time clock), this is determined as follows:

The number representing the end of the period in question is located upon the scale 26 of the disc 25 and this disc is rotated to register the line adjacent the number representing the time with respect to the hair line 47 of the section 24.

The number representing the time of the day at which the period began is located upon the scale 32 of the disc 31. This disc 31 is rotated to bring the line of the scale of that number in alignment with the hair-line 47 of the portion 24. With the scales of the discs 25 and 31 in these positions, the lapse of time in hours and minutes may be read on the scale of the disc 25. For example, the question is presented "what is the number of hours and minutes between 11:15 a. m. and 3:30 p. m.?"

The division line of the scale 26 of the disc 25 representing 3:30 p. m. is rotated to registration with the hair-line 47 of the portion 24. Holding this disc 25 against further rotation, the divisional line of the scale 32 of the disc 31, representing 10:15 a. m. is rotated to a position in alignment with this hair-line 47 of the portion 24. The solution is found on the scale of the disc 25 opposite 12 on the scale of the disc 31 and the mark at this point will be seen to represent 15 minutes past the hour of five, which means that five hours and 15 minutes is the length of the interval in question. It will be noted that no account need be taken of the fact that the two times of the day selected may be variously a. m. or p. m., as such designations will have no effect on the final result.

It may often be desirable to obtain the answer to the above problem in any one of several "accounting period systems" which are various methods of subdividing an hour into smaller units for which one unit of wages is paid. These smaller intervals may be 5, 6, 10 or 15 minute intervals. This will bring into application the scales 27, 28, 29 and 30, each of which are divided into 12 hours but the subdivisions of these hours consist of the units indicated instead of minutes, as on the scale 26, and each of these subdivisions is further divided equally in half so that any hair-line setting will show as plus a fraction less than one-half or plus a fraction of one-half or more, the former disregarded and the latter counted as an extra period. Depending upon the fraction desired will determine which of the scales 27 to 30 inclusive is to be exposed through its respective opening formed in the cover disc or plate 34, it having been heretofore pointed out that this cover disc 34 is adjusted relative to the disc 31 by selectively engaging the pin 44 in its proper opening 45.

An example taken into consideration as to the function of the scale 19 on the segment 12 and the scales 27 and 30 may be thus delineated:

Assuming that it is desired to determine what is the amount of time between 10:15 a. m. and 3:30 p. m., discounting a lunch hour of 45 minutes, the answer would be given in tenth hours.

The solution is found as follows. The cover disc 34 is disengaged from latched connection with the disc 31 by flexing the same to disengage the pin 44 from the opening 45 and this cover disc is rotated until the opening 37 is positioned to expose portions of the scale 29, after which the cover disc 34 is again latched to the disc 31 by passing the pin 44 through the adjacent opening 45.

The finger 21 is pivoted relative to the scale 19 until the hairline 47 of the tab 22 registers with the division line corresponding to 45 minutes. The disc 25 is now rotated to register the hairline 47 of the segment 12 with the division mark representing 3:30 on the scale 26. The disc 31 is now rotated until the division mark of the scale 32 thereof is in alignment with the hairline 47 of the tab 22, which represents 10:15. Through the opening 37 will appear the fifth division following figure 4. The answer or solution to the problem, deducting the lunch hour and rendering the answer in tenth hours, is 4.5 hours. If the lunch period had not been deducted, the solution, viewed through the opening 37, would have indicated the hairline position half way between the second and third divisions following number 5 or 5.25 hours, which would be interpreted for pay purposes as 5.3 hours.

The device can be made of any size and of any material. From the foregoing description, it will be apparent that by the use of my computing device, the possibility of errors is reduced to a minimum and the speed of computing is increased to a maximum.

While I have illustrated and described the preferred form of construction for carrying my invention into effect, this is capable of variation and modifications without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, and means for releasably latching said cover plate in selected position upon said outer disc.

2. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, and means for releasably latching said cover plate in selected position upon said outer disc, said last named means including a plurality of equally spaced openings in the cover plate and a pin carried by said outer disc for selective engagement in said openings.

3. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, means for releasably latching said cover plate in selected position upon said outer disc, a lateral tab provided by said mounting base, a scale bearing member mounted on said tab, and a hairline bearing member movable over said scale bearing member and pivoted to said mounting base by said means for rotation over said mounting base, said scale bearing member having a hairline thereon for registration with the divisions of the scale on said innermost disc and for alignment with the divisions of the scale on the outermost disc.

4. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, means for releasably latching said cover plate in selected position upon said outer disc, a lateral tab provided by said mounting base, a scale bearing member mounted on said tab, and a hairline bearing member movable over said scale bearing member and pivoted to said mounting base by said means for rotation over said mounting base.

5. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, means for releasably latching said cover plate in selective position upon said outer disc, a lateral tab provided by said mounting base, a scale bearing member mounted on said tab, and a hairline bearing member movable over said scale bearing member and pivoted to said mounting base by said means for rotation over said mounting base, said scale bearing member having a hairline thereon for registration with the divisions of the scale on said innermost disc and for alignment with the divisions of the scale on the outermost disc, said last named means including a plurality of equally spaced openings in the cover plate and a pin carried by said outer disc for selective engagement in said openings.

6. A time interval computator comprising a mounting base, concentrically arranged discs of different diameters arranged upon said base, means for connecting said discs to said base for rotation relative to said base and for independent rotation with respect to each other, a scale on the marginal edge of each of said discs, said scale being divided into divisions and said divisions each representing one minute, a plurality of scales on the innermost of said discs and arranged concentrically with respect to each other, the outermost of said discs having an opening formed therein, through which said plurality of scales may be viewed, a cover plate pivotally connected by said means to said mounting base over said outer disc for rotation independent of said outer disc, said cover plate having a plurality of radially positioned openings formed therein providing sight windows adapted to selectively register with a portion of the opening in said outer disc, means for releasably latching said cover plate in selected position upon said outer disc, a lateral tab provided by said mounting base, a scale bearing member mounted on said tab, and a hairline bearing member movable over said scale bearing member and pivoted to said mounting base by said means for rotation over said mounting base, said last named means including a plurality of equally spaced openings in the cover plate and a pin carried by said outer disc for selective engagement in said openings.

CARL F. STRATE.